Aug. 16, 1966 — W. J. GOETTSCH — 3,266,690
APPARATUS FOR METERING AND FEEDING CORRUGATED PAPERBOARD
Filed Dec. 12, 1963 — 2 Sheets-Sheet 1
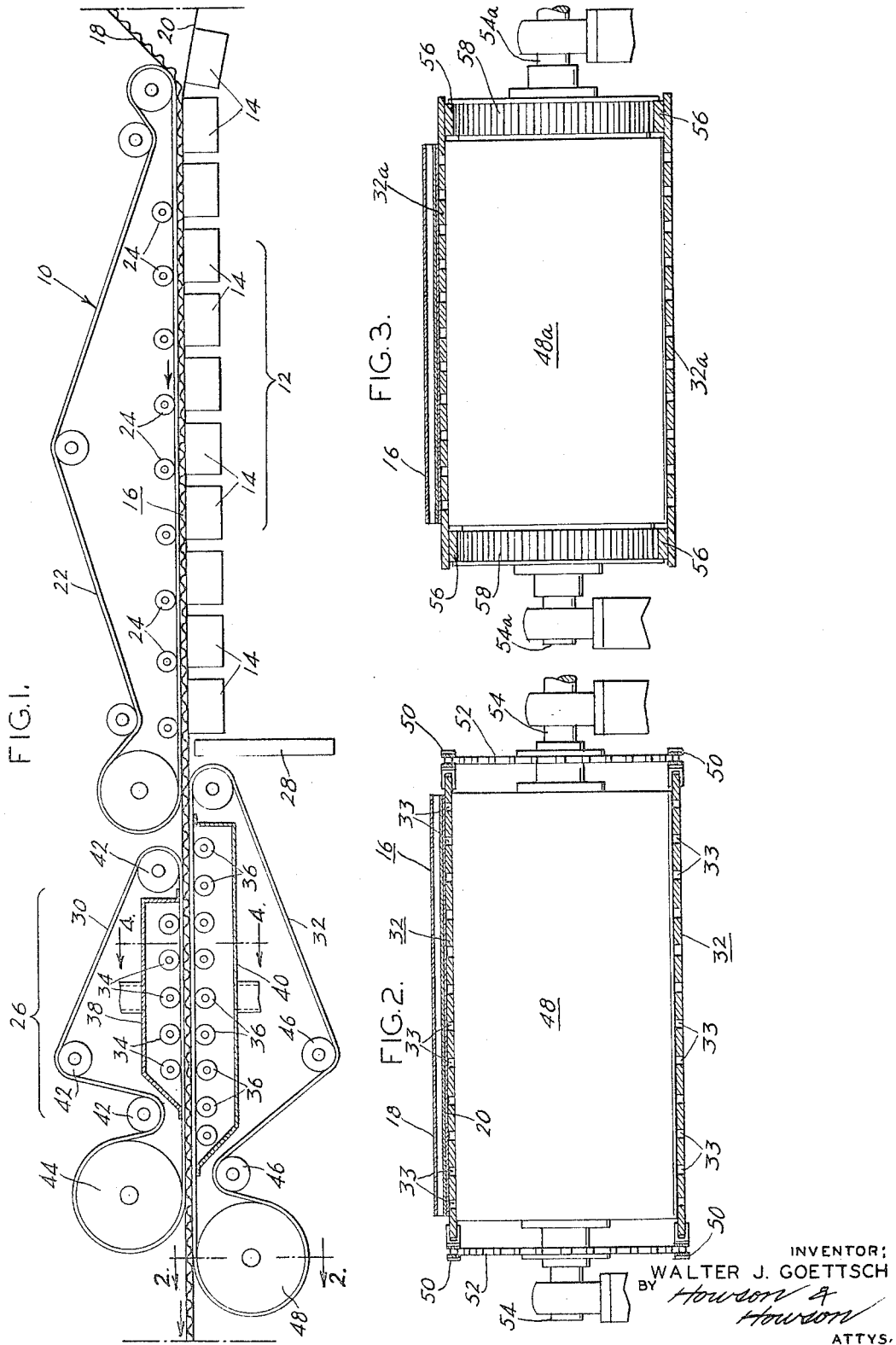
INVENTOR:
WALTER J. GOETTSCH
BY Howson & Howson
ATTYS.

INVENTOR:
WALTER J. GOETTSCH
BY Howson & Howson
ATTYS.

United States Patent Office 3,266,690
Patented August 16, 1966

3,266,690
APPARATUS FOR METERING AND FEEDING CORRUGATED PAPERBOARD
Walter J. Goettsch, Kenilworth, Ill., assignor to Samuel M. Langston Company, Camden, N.J., a corporation of New Jersey
Filed Dec. 12, 1963, Ser. No. 330,197
5 Claims. (Cl. 226—95)

The present invention relates generally to apparatus for metering and feeding corrugated paperboard and more particularly an apparatus adapted for use with double facer machines.

The bulk of the corrugated paperboard currently manufactured is known as "double faced" corrugated paperboard and consists of an inner corrugated or fluted member sandwiched between outer facing sheets or liners. In the usual operation this is made in steps by first combining the corrugated member with one liner to form what is known as "single faced" corrugated paperboard. This product is then combined with a second liner to form double faced corrugated paperboard, the combining operation taking place in apparatus known in the art as a double facer machine. Such a combining unit may also be employed to produce "double wall" or "triple wall" or other varieties of corrugated board, although it is generally termed a double facer machine.

A double facer typically includes a pair of endless belts between which the single faced web and liner are combined in biased relationship with adhesive therebetween and advanced through heating and cooling regions. The double facer belts, normally made of cotton or synthetic fabric, or a combination thereof, serve to blanket the board components to effect efficient bonding thereof. The belts also absorb and discharge some of the excess water content of the components and the adhesive applied thereto, and equalize the heat and moisture content of the components. In addition, a primary function of the belts heretofore has been the pulling and conveying of the board through the double facer machine.

Since the double faced paperboard emerging from the double facer machine is a relatively stiff product, successive slitting, scoring and blanking operations are generally carried out sequentially. In the usual installation a slitter scorer and a rotary cut-off machine are placed downstream from the double facer in the path of travel of the web automatically and continuously perform the above operations.

In order to achieve an uniformly dimensioned blank at the rotary cut-off machine, the feed of the double faced board must be as uniform as possible. Any variation in the rate of feed, such as might be caused by slippage of the double facer belts relative to their drive pulleys or relative to the board, will result in sheet length variation. because of such slippage and other factors, the double belts are unable to provide a uniform feed of the board to the cut-off apparatus resulting in a substantial amount of waste in the form of improper length sheets.

In view of the above, it is a primary object of the present invention to provide apparatus for metering and feeding corrugated paperboard through double facer machines and attendant auxiliary equipment at a uniform speed.

A further object of the invention is to provide an apparatus for metering and feeding corrugated paperboard through a double facer machine which by preventing sheet variation and waste at the rotary cut-off will increase the efficiency of the operation.

Additional objects and advantages of the invention will be more readily apparent from the following detailed description of an embodiment thereof when taken together with the accompanying drawings in which:

FIG. 1 is a schematic side elevational view showing the manner in which a first embodiment of the invention is combined with a double facer unit to provide a uniform metering and feeding of the combined web passing therethrough;

FIG. 2 is a sectional view taken along line 2—2 of FIG. 1 showing the manner in which the section belts are driven in a non-slipping manner;

FIG. 3 is a view similar to that of FIG. 2 showing a modified means for driving the suction belts;

Figure 4:
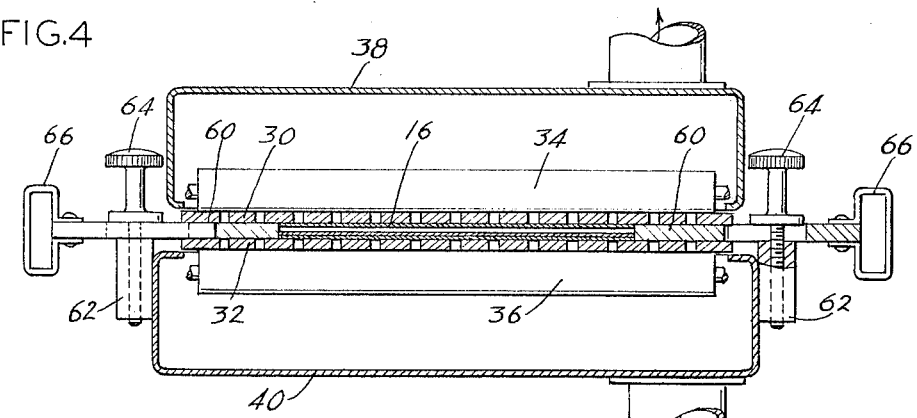
FIG. 4 is a sectional view taken along line 4—4 of FIG. 1 showing a means for varying the effective width of the suction belts.

Referring to FIG. 1 of the drawings, the invention is adapted for use in conjunction with a double facer 10 having a conventional heating and curing section 12 characterized by hot plates 14 over which passes the combined double faced board or web 16. The double faced board is formed from the single faced web 18 and liner 20 which are combined with adhesive therebetween and conveyed and biased by the double facer belt 22 and the idler pressure rolls 24 over the hot plates 14.

Figure 6:
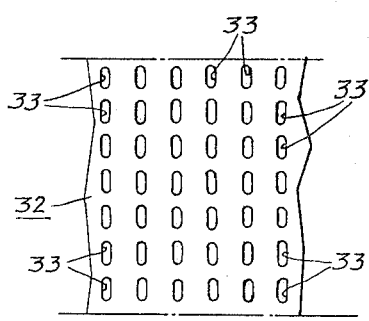
FIG. 6 is a plan view showing a portion of one of the perforated endless suction belts incorporated in the embodiment shown in FIG. 1.

The heating and curing section 12 is separated from the cooling section 26 by a suitable partition 28. The cooling section in this particular embodiment includes a novel arrangement for metering and feeding the corrugated web 16 which comprises opposed continuous upper and lower suction belts 30 and 32 having spaced perforations 33 therein as shown in FIG. 6. The suction belts are maintained in intimate surface contact with the double faced web 16 by the upper and lower idler pressure rolls 34 and 36 and in addition by the suction effect provided by the upper and lower vacuum or suction boxes 38 and 40. The upper suction belt 30 is driven around idler rolls 42 by the driving roll 44. Similarly, the lower suction belt 32 is driven about idler rolls 46 by the lower suction belt driving roll 48.

The driving rolls 44 and 48 effect a positive drive of the upper and lower suction belts 30 and 32 in a manner described in detail below such that a uniform rotation of the driving rolls produces a uniform metering and feeding of the double faced web 16 through the apparatus. The driving rolls 44 and 48 may be driven from a common line shaft with the rotary cut-off machine and related apparatus to effect an accurate blanking operation. Slippage of the double faced web is prevented by the suction belt drive which provides a high coefficient of friction between the double faced web and the suction belts.

The manner in which the suction belts may be positively driven is shown in FIG. 2 in which the lower suction belt 32 is provided with chains 50 attached along both side edges thereof and adapted for coaction with the sprockets 52 mounted on a common drive shaft 54 with the lower drive roll 48. An alternate manner in which the suction belts may be driven is shown in FIG. 3 in which a suction belt 32a is provided with timing belts 56 secured to the edges thereof, such as in the case of rubber suction belts, by vulcanizing. Timing belt sheaves 58 adapted for engagement with the timing belts 56 are mounted on a common drive shaft 54a with the driving drum 48a. Although the above are the preferred arrangements for driving the suction belts, other means may be utilized such as a standard drum belt drive relying on friction to prevent belt slippage. The preferred embodiments however eliminate the possibility of belt slippage and permit the use of a substantially smaller drive roll.

Means may be provided to limit the effective width of the suction belts for use of the apparatus with webs of various widths. As shown in FIG. 4, the double faced board 16 is of a substantially narrower width than the suction belts 30 and 32. To prevent loss of the vacuum in the suction boxes, adjustable shutters 60 having a thickness equal to the double faced board thickness are adjustably mounted on the suction box 40 by supports 62 and adjusting knobs 64 threadedly engaged therewith. Handles 66 on the adjustable shutters 60 in conjunction with the adjusting knobs 64 permit ready adjustment of the shutters. The shutters extend along the entire length of the suction boxes.

Figure 5:
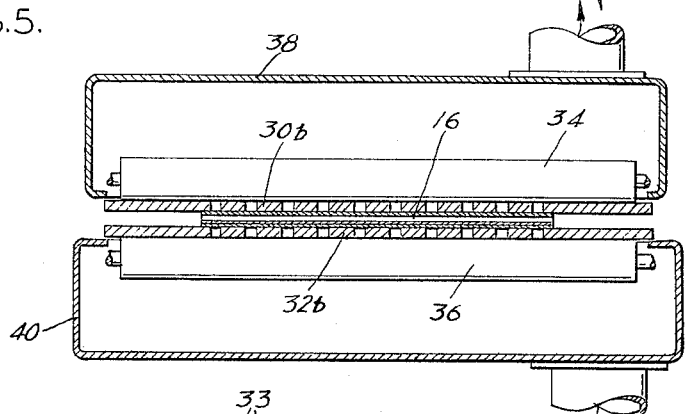
FIG. 5 is a view similar to FIG. 4 showing an alternate arrangement adapting the apparatus for use with webs of varying widths.

An alternate arrangement permitting variation in double faced web width is shown in FIG. 5 and consists in the limiting of the perforations in the suction belts 30b and 32b to a width of approximately two-thirds the width of the suction belt, this being generally the minimum width of board that will be processed through the double facer. In this alternate arrangement a loss of suction is prevented since even the narrowest double faced board covers all of the suction belt perforations.

The operation of the apparatus illustrated in FIG. 1 entails simply the driving of the drive rolls 44 and 48 at a uniform speed to effect a uniform suction belt speed such as by means of the positive drive arrangements shown in FIGS. 2 and 3. As pointed out above, the drive rolls 44 and 48 may be driven by a common drive means with the cut-off apparatus to insure the cutting of uniformly dimensioned blanks. The suction belts because of their large area of contact with the double faced board and the high coefficient of friction resulting from the suction effect and the idler roll pressures prevents slippage between the belts and the double faced board. The suction belts are preferably of rubber or other suitable material having a high coefficient of friction with respect to the paperboard web.

The above-described metering and feeding apparatus may be modified to comprise a single suction belt in contact with the double faced web, which may be either above or below the web. The possibility of web slippage is minimized, however, by the employment of upper and lower suction belts as shown in the embodiment of FIG. 1.

Figure 7:
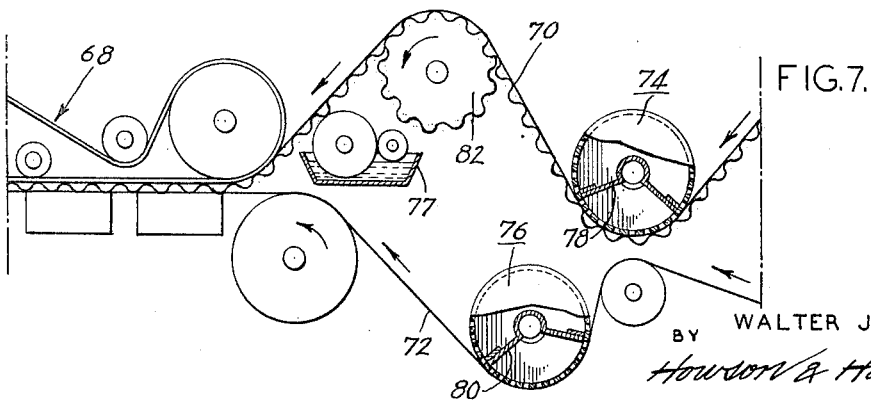
FIG. 7 is a schematic side elevational view showing a further embodiment of the invention adapted for metering and feeding the individual web components at the infeed end of a double facer machine.

Referring to FIG. 7, a modified embodiment of the invention is shown in which the individual double faced board components are advanced at a uniform speed by means of a vacuum drive arrangement comprising suction rolls at the infeed end of a conventional double facer 68. The single faced web 70 and the liner 72 are metered and fed by suction rolls 74 and 76 prior to the application of adhesive to the flutes of the single faced web by the glue machine 77 and the combination of the webs in the double facer. The suction rolls 74 and 76 consists of perforated drums within which are reciprocally mounted the suction boxes 78 and 80 extending over the drum areas engaged by the web components. A corrugated feeding roll 82 with an appropriate tooth contour is employed in cooperative engagement with the corrugated face of the single faced web to provide an added positive drive function.

In operation, the suction rolls and corrugated feeding roll are driven at a uniform rate such as by a common line shaft with the rotary cut-off unit to provide a uniform metering and feeding of the double face board components. Such a metering and feeding arrangement may be used with respect to a single one of the web components or without the corrugated feeding roll although an improved metering and feeding is effected by the use of the combined feed arrangement illustrated.

Although the described embodiments of the invention have been shown and discussed as used to meter and feed a double faced board or its components, it should be understood that the invention is adaptable for the metering and feeding of any type of corrugated paperboard and any number of paperboard components.

Manifestly, changes in details of construction can be effected by those skilled in the art without departing from the spirit and the scope of the invention as defined in and limited solely by the appended claims.

I claim:

1. Apparatus for improving the uniformity of the web feed rate of a double facer machine for producing corrugated paperboard comprising feed means for feeding and metering one of the web components having a corrugated face and an opposed smooth face, said feed means comprising a corrugated roll adapted for mating engagement with the corrugated face of the web component and a suction roll adapted for engagement with the smooth face of the web component, each roll being adapted for uniform driving engagement with the web component by a common drive means, a means for feeding a second smooth web component for adhesive application to said corrugated face.

2. Apparatus for improving the uniformity of the web feed rate from a double facer machine for subsequent operations of slitting, scoring, blanking and the like, comprising a pair of endless suction belts for engagement with the opposed sides of a web of double faced corrugated paperboard issuing from a double facer, said belt having perforations therethrough disposed over a central longitudinally extending portion of the belts corresponding to at least two-thirds of the belts between the side edges of the belts, means for uniformly driving said belts at the desired web speed, said drive means including members rotatable about axes extending transversely across the belt, said members being meshingly engaged with side edge portions of the belts, spaced idler rollers within the loop of said belts and having their longitudinal axes extending transversely across the belts, means operable to effect a vacuum on said belts to bias the web against the belts and thereby prevent slippage of the web with respect to the belts and to bias said belts against said rollers to prevent frictional drag on the belts, said idler rollers being positioned within said vacuum effecting means.

3. Apparatus in accordance with claim 2 including adjustable imperforate shutters between juxtaposed side edges of said belts for obscuring holes in said belts disposed to one side of the web, said shutters having a thickness corresponding to the thickness of the web, and said shutters being adjustable in a direction corresponding to the axes of said rollers so that webs of different widths may be accommodated between the shutters.

4. Apparatus for improving the uniformity of web feed rate from a double facer machine for producing corrugated paperboard comprising upper and lower endless perforated suction belts, at least a central two-thirds portion of said belts being perforated, idler rollers within the loop of said upper belt, idler rollers within the loop of said lower belt, each of said belts being in rolling engagement with their respective rollers, each of said belts being adapted to engage a major face of the web for metering and feeding the web from the double facer machine to equipment for subsequent processing of the web, a drive roll in operative engagement with each belt for advancing each belt at the desired web speed, a suction box in sealed relation with each belt and juxtaposed to its respective idler rollers, said idler rollers being positioned inside said suction boxes, and means operable for effecting a vacuum in each box to bias the web against the suction belts and the belts against their respective rollers whereby the web will be subjected to an advancing force on opposite sides thereof and the belts will be in rolling engagement with their respective rollers.

5. Apparatus for improving the uniformity of the web feed rate from a double facer machine for subsequent operations of slitting, scoring, blanking and the like, comprising an endless suction belt for engagement with a web of double faced corrugated paperboard issuing from a double facer, at least a central two-thirds portion of said belt being perforated, means for uniformly driving said belt at the desired web speed, said drive means including a member rotatable about an axis extending transversely across the belt, said member being meshingly engaged with a side edge portion of the belt, spaced idler rollers within the loop of said belt and having their longitudinal axes extending transversely across the belt, means operable to effect a vacuum on said belt to bias the web against the belt and thereby prevent slippage of the web with respect to the belt and to bias said belt against said rollers to prevent a frictional drag on the belt, said means including an open top housing having side wall portions, said belt overlying said open top of the housing and being supported by said rollers, said idler rollers being positioned within said housing and supported by said wall portions.

References Cited by the Examiner

UNITED STATES PATENTS

| | | | |
|---|---|---|---|
| 794,402 | 7/1905 | Goldman | 198—194 |
| 2,166,749 | 7/1939 | Burrell | 156—471 |
| 2,753,181 | 7/1956 | Anander | 226—95 |
| 2,987,105 | 6/1961 | Gebbie | 156—210 |
| 3,026,231 | 3/1962 | Chavannes | 156—205 |
| 3,057,529 | 10/1962 | Fitch | 226—95 |
| 3,140,030 | 7/1964 | Stewart | 226—95 |

EVON C. BLUNK, *Primary Examiner.*

RICHARD E. AEGERTER, SAMUEL F. COLEMAN,
*Examiners.*